United States Patent [19]

Floyd et al.

[11] Patent Number: 4,877,624

[45] Date of Patent: Oct. 31, 1989

[54] DIGESTION AND STERILIZATION METHODS AND APPARATUS

[75] Inventors: Terry S. Floyd, Clover, S.C.; Wyatt P. Hargett, Jr., Matthews, N.C.

[73] Assignee: CEM Corporation, Matthews, N.C.

[21] Appl. No.: 185,250

[22] Filed: Apr. 19, 1988

Related U.S. Application Data

[60] Continuation of Ser. No. 851,785, Apr. 14, 1986, abandoned, which is a division of Ser. No. 722,266, Apr. 11, 1985, abandoned.

[51] Int. Cl.[4] .......................... A23L 3/00; A23L 3/26; F16K 15/14
[52] U.S. Cl. ........................................ 426/241; 99/337; 99/359; 137/522; 219/10.55 R; 219/10.55 M; 220/209; 222/494; 422/113
[58] Field of Search .................. 422/113; 220/209; 222/402.21, 494; 137/496, 468, 522, 859; 426/241, 234, 243; 99/337, 338, 359, 369; 219/10.55 R, 10.55 M

[56] References Cited

U.S. PATENT DOCUMENTS

| 1,925,926 | 3/1932 | Kunkel . | |
| 2,854,996 | 1/1934 | Hughes . | |
| 3,265,084 | 5/1934 | Wagner . | |
| 3,680,555 | 8/1972 | Warncke . | |
| 3,804,113 | 4/1974 | Garcea . | |
| 3,827,456 | 8/1974 | Sheppard | 137/859 |
| 4,020,828 | 5/1977 | Stead | 137/859 |
| 4,061,254 | 12/1977 | Nilson | 222/494 |
| 4,400,401 | 8/1983 | Beauvais et al. | 426/234 |
| 4,406,861 | 9/1983 | Beauvais et al. | 422/113 |
| 4,457,327 | 7/1984 | Pepper | 422/113 |
| 4,474,211 | 10/1984 | Lucas . | |
| 4,474,314 | 10/1984 | Roggenburg . | |
| 4,490,597 | 12/1984 | Mengel . | |
| 4,493,444 | 1/1985 | Del Bon et al. . | |
| 4,613,738 | 12/1986 | Saville . | |

FOREIGN PATENT DOCUMENTS 2603712 4/1977 Fed. Rep. of Germany .
210019 7/1981 United Kingdom .

OTHER PUBLICATIONS

CEM Corporation Operation Manual "Microwave Drying/Digestion System", Model MDS-81, (3-1985).
Abu-Samra et al., Analytical Chemistry, 47, 1475, (1975).
Barrett et al., Analytical Chemistry, 7, 1021, (1978).
Nadkarni, Analytical Chemistry, 56, 2233, (1984).
Matthews et al., Bureau of Mines Technical Progress Report 120, (Apr. 1983).
Operation and Service Manual, Microwave Drying-/Digestion System, Model MDS-81, CEM Corporation, (revised Mar. 1985).

Primary Examiner—Steve Alvo
Attorney, Agent, or Firm—Timothy R. Kroboth

[57] ABSTRACT

A valve that opens and closes in response to changes in the physical environment of the valve. This valve is particularly suited as a relief valve in a microwave system-based, closed vessel digestion procedure. This valve includes a pressure-deformable, resilient wall member having a fluid vent port, and an obstructing member that cooperates with the wall member to open and close the valve.

Also provided is a lidded vessel employing this improved valve, an apparatus that includes a microwave system and this lidded vessel, and methods using this improved valve.

9 Claims, 7 Drawing Sheets

DIGESTION AND STERILIZATION METHODS AND APPARATUS

This application is a continuation of application Ser. No. 851,785 filed Apr. 14, 1986, now abandoned, which is a division of application Ser. No. 722,266, filed Apr. 11, 1985, now abandoned.

TECHNICAL FIELD

The present invention relates to an improved valve. More particularly, this invention relates to a valve that opens and closes in response to a change in the physical environment of the valve, and that is especially useful as a relief valve. Furthermore, this invention pertains to a lidded vessel including this improved valve, and to uses of this valve.

BACKGROUND ART

As exemplified by A. Abu-Samra et al., *Analytical Chemistry*, 47, 1475 (1975), and P. Barrett et al., *Analytical Chemistry*, 7, 1021 (1978), a microwave ovenbased, digestion technique using an acid digesting agent in an open vessel, is known. Barrett et al. report that this procedure decreases digestion time, compared to a hot plate heat source.

Also known, as illustrated by Nadkarni, *Analytical Chemistry*, 56, 2233 (1984), and S. A. Matthews et al, Bureau of Mines Technical Progress Report 120 (April 1983) is a microwave oven-based, digestion technique using an acid digesting agent in a closed system. In Nadkarni's procedure, a covered Teflon ® or polycarbonate beaker was placed in a partially evacuated, closed, glass desiccator so that acid fumes leaking from the covered beaker were trapped within the glass desiccator. A polycarbonate bottle with a polypropylene screw cap was used as a closed digestion vessel by Matthews et al., who cautioned against explosion caused by pressure build up within a closed vessel and observed leaking of some acid fumes around the bottle caps during pressure dissolution. Matthews et al. report that, compared to open vessel digestion, closed vessel digestion prevents the introduction of contaminating elements and the loss of volatile elements and compounds.

Accordingly, although closed system digestion has been found to have advantages over open vessel digestion, the containing vessel in a closed system could explode under pressure build up, with spewing of acid. The explosion hazard is enhanced, for example, if, as in tissue digestion, gas is generated by the digestion process. As a result, open vessel digestion is commonly utilized, particularly if the digestion process generates gas.

A lidded digestion vessel suitable for use in a microwave system-based digestion that employs a corrosive digesting agent, is available from Savillex Corporation either with or without an outlet port in the lid. This lidded vessel is formed of a deformable, resilient, highly chemically inert, thermoplastic material. This material is a fluorocarbon copolymer in which the carbon-fluorine backbone in the main chain is connected with perfluoroalkoxy side chains through oxygen links. This fluorocarbon copolymer is marketed by Dupont Corp. under the trademark Teflon ® PFA.

Prior art valves are exemplified by U.S. Pat. Nos. 4,474,211 to Lucas, 4,493,444 to Del Bon et al, and 4,400,401 to Beauvais et al. The Del Bon et al patent is directed to a self-closing valve-and-lid assembly. The Lucas patent pertains to a valve that includes a disc-like member through which apertures extend, and an aperture closing device having a pressure responsive flex web with openings offset from the apertures. The Beauvais et al patent relates to a method using microwave energy for sterilizing and canning food products within a nonmetallic enclosure cover having an aperture controlled by a check valve regulated by a weight. Within the enclosure cover, a non-metallic jar with a nonmetallic lid having a vent hole closed by a vent closure, contains the food product.

Also known in the prior art is a manually operated, dispensing valve formed by an opening in a metallic can lid top, a resilient rubber insert located inside the lid top and having an outlet port portion that extends through the lid top, and a plastic pin element. The plastic pin element has a disc-like part with a raised portion that seats against the rubber insert to close the valve, and has a pin-like part that extends through the outlet port portion of the rubber insert for engagement with a nozzle. The valve is opened by finger pressure exerted against the nozzle.

Prior work known to us is a beryllium-copper spring, needle check valve of Lois B. Jassie and H. M. Kingston. This valve attaches to an outlet port of a closed digestion vessel, as a pressure relief valve for explosion prevention. Because the beryllium-copper spring does not absorb microwave radiation, this valve is usable in a microwave system-based digestion procedure. However, a drawback is that beryllium is oxidizable, especially in an acid fume environment, to beryllium oxide, which results in the valve no longer being acceptable for use in a microwave system. Moreover, beryllium oxide is carcinogenic.

Therefore, there is a need for an improved valve that could be used as a pressure relief valve for explosion prevention in a microwave system-based, closed vessel digestion procedure. Such an improved valve would be of even greater usefulness if it were self-closing after excess pressure had been relieved, and thereby could function as more than a one time pop-off valve. Such an improved valve would provide an even greater contribution to the art if it relieved pressure not only in response to a predetermined internal fluid pressure but also in response to temperature change. Such a valve would provide an improved apparatus for microwave system-based, closed vessel digestion.

Moreover, an improved valve of this type would be especially advantageous if it could also be manually opened. This improved valve would be especially remarkable if the components thereof could be of the same non-metallic material. Furthermore, such an improved valve would be of enhanced utility if it had a broad range of applications.

DISCLOSURE OF THE INVENTION

It is accordingly an object of the present invention to provide an improved valve that could be used as a pressure relief valve for explosion prevention in a microwave system-based, closed vessel digestion procedure.

It is a further object of the present invention to provide an improved relief valve that is self-closing after excess pressure has been relieved, and thereby functions as more than a one time pop-off valve.

It is an even further object to provide an improved valve that relieves pressure not only in response to a predetermined internal fluid pressure but also in response to temperature change.

It is a still further object to provide an improved apparatus for microwave system-based, closed vessel digestion utilizing this valve.

It is an additional object to provide an improved valve of this type that can be manually operated.

It is an even additional object to provide an improved valve the components of which may be non-metallic and of the same material.

It is another object to provide an improved valve having a broad range of applications.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided a valve responsive to a predetermined internal fluid pressure. This valve included a pressure-deformable, resilient wall member having a fluid outlet port. The valve further includes an obstructing member engaged in a tight sealing relationship with an inside surface of the wall member or with an inner surface of the outlet port. As a result, outflow through the outlet port is blocked when internal fluid pressure impinging on the wall member is insufficient to cause deformation thereof that overcomes the tight sealing relationship.

The wall member is sufficiently pressuredeformable that the force of the predetermined internal fluid pressure acting thereon, causes deformation thereof that overcomes the tight sealing relationship, thereby opening the valve to permit pressure relief through the outlet port. The resiliency of the fluid pressure-deformed wall member is sufficient to cause the wall member to reengage in the tight sealing relationship when internal fluid pressure impinging on the wall member becomes less than the predetermined internal fluid pressure, thereby closing the valve. Accordingly, this valve opens and closes in response to a predetermined internal fluid pressure. In a preferred embodiment, this valve is sensitive not only to internal fluid pressure but also to temperature.

Also provided by the present invention is a lidded vessel that employs the improved valve of the present invention.

In addition, there is provided an apparatus that includes a microwave system and a lidded vessel employing the improved valve of the present invention. In a preferred embodiment, the microwave system includes a corrosion resistant chamber, a corrosion resistant exhaust system capable of providing high volume air flow through the chamber, an element for absorbing excess reflected radiation, and a computer-controlled variable power source. The lidded vessel is microwave transparent.

Also provided by the present invention are methods using the improved valve of the present invention. These methods include use in canning a food product, sterilizing an object, and dispensing a fluid at a desired temperature.

In the drawing and in the detailed description of the invention that follows, there are shown and essentially described only preferred embodiments of this invention, simply by way of illustration of the best mode contemplated by us of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts preferred embodiments of an improved value in accordance with the present invention and uses of the improved valve.

BEST MODE FOR CARRYING OUT THE INVENTION

As explained earlier, the present invention is directed to an improved value. More particularly, this invention relates to a self-regulating valve that opens and closes in response to a change in the physical environment of the valve, in particular to a change in internal fluid pressure. In a preferred embodiment, this improved valve is also temperature sensitive, and therefore able to respond not only to internal fluid pressure but also to temperature change. In this embodiment, the components of the valve can amazingly be made of the same material. Also in this embodiment, the valve is microwave radiation transparent and is therefore useful as a relief valve in a microwave systembased, closed vessel digestion technique, even when the digestion generates gas. In a very preferred embodiment, the improved valve is highly chemically inert and accordingly corrosion resistant. Also in a preferred embodiment, the improved valve of this invention can be manually opened.

Also as explained earlier, our invention is directed to a lidded vessel employing this improved valve, to an apparatus including a microwave system and this lidded vessel, and to methods using the improved valve.

The term "fluid" as used in our description of the present invention and in the claims, means a liquid, gas or vapor, and the terms "upper", "lower", "above", "below", "upward" and "downward" are intended to designate relative orientation of the valve as shown in the Figures.

Figure 1:
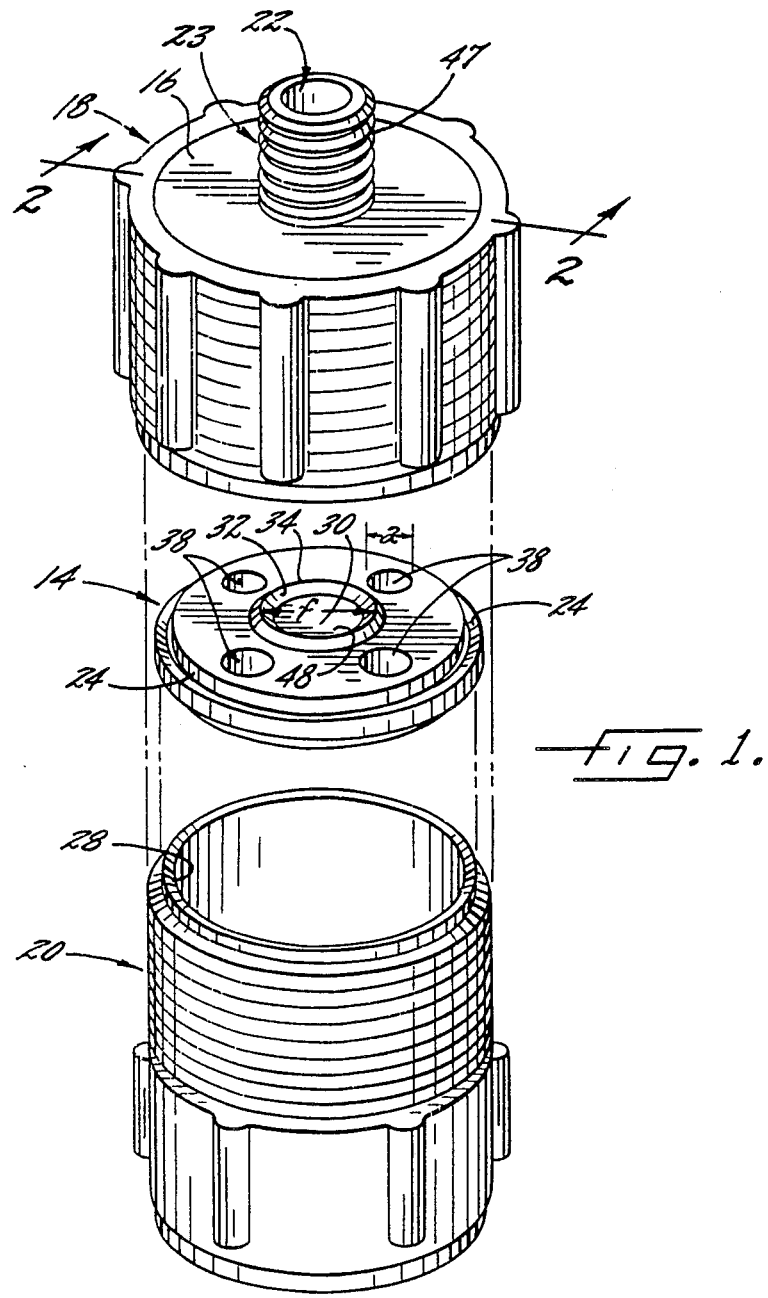
FIG. 1 is an isometric view of the components of a lidded vessel employing a very highly preferred embodiment of a valve in accordance with the present invention.
Figure 3:
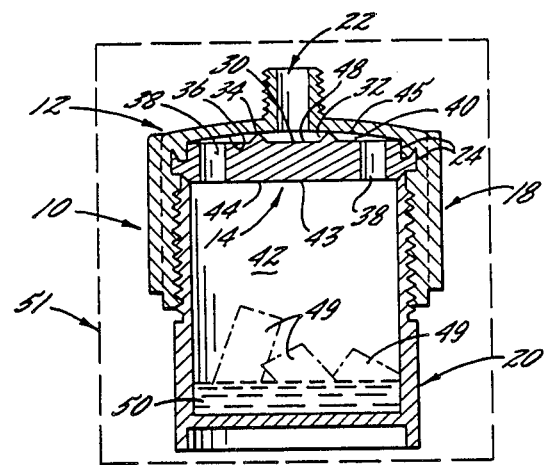
FIG. 3 is a sectional view of the assembled lidded vessel and member 12 of FIG. 1 taken in a plane through the central assembly axis, showing the valve in closed position and depicting contents in phantom within the lidded vessel.
Figure 4:
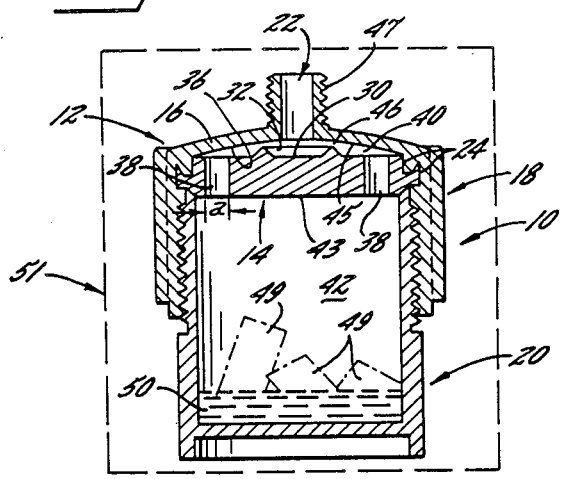
FIG. 4 is a sectional view identical to that of FIG. 3, except that the valve is shown in open position in response to a certain fluid pressure within the lidded vessel.

FIGS. 1, 3 and 4 depict a lidded vessel 10 utilizing a very highly preferred embodiment of a valve 12 in accordance with the present invention. Valve 12 is formed by a disc-shaped member 14, and a deformable, resilient top wall 16 of a lid 18 of a hollow receptacle or container 20. Centrally located in the lid is a fluid outlet port 22. Lid 18 includes an upright sleeve 23 that extends the outlet port above wall member 16.

Preferably, disc-shaped member 14 and the entirety of lidded vessel 10 are formed of a deformable, resilient, thermoplastic material, that is very preferably the same for each of member 14, the lid and the container. Even more preferably, this material is the fluorocarbon copolymer described earlier. Preferably, the cross-sectional thickness of disc 14 imparts semi-rigidity to the disc.

Disc 14 has a peripheral wall surface 24 that conforms to an upper inside wall surface 26 of the lid, and enables the disc to be locked in place between the lid and an upper rim 28 of container 20. Encircling, and spaced apart from, a center 30 of the disc is a raised abutment ring 32 having a peak 34, which provides point contact between the disc and an inner surface 36 of lid top 16. As can best be seen in FIG. 1, located between ring 32 and peripheral wall surface 24 are apertures 38, each having a flow area "A", defined by a diameter "a".

Figure 2:
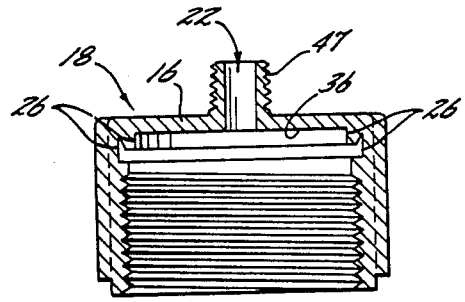
FIG. 2 is a cross-sectional view of the lid of the lidded vessel of FIG. 1 along the line 2—2.

With reference to FIG. 3, which shows valve 12 in closed position, the abutment ring peak of semi-rigid disc 14 pushes against flexibly deformable, lid top 16 so as to cause the lid top to bulge outwardly. Outward bulging of the lid top is seen by comparison to the undistorted lid shown in FIG. 2. The point contact provided by the abutment ring peak produces a tight sealing relationship between ring 32 and inner lid top surface 36.

Peak 34 is appropriately spaced apart from center 30 of the disc such that it surrounds outlet port 22 of the lid, thereby obstructing flow through the outlet port. The outlet port and abutment ring could be offset from the central assembly axis, provided that they are so located relative to one another in the assembled valve, that the abutment ring peak surrounds the outlet port.

As shown in FIGS. 3 and 4, disc 14 divides lidded vessel 10 into compartments 40 and 42. Apertures 38 permit internal fluid pressure to be equally exerted against lid top 16 and other walls of the lidded vessel. The number of apertures, whether one or many, is not critical; rather, the sum of areas "A" of the apertures should not restrict flow to the cap.

So long as the force of the internal fluid pressure acting on lid top 16 is less than or only equal to the pressure of abutment ring 32 against the lid top, valve 12 remains closed. Internal fluid pressure pushing against a central area 43 of a lower disc surface 44, assists the mechanical pressure exerted by the abutment ring to strengthen the tight sealing relationship between peak 34 and inner top surface 36. Hence, the force of internal fluid pressure is utilized to enhance closure of the valve. Central area 43 is defined by a diameter "f" of the abutment ring peak.

A donut-shaped area 45, which consists of the area of inner lid top surface 36 outside the abutment ring peak, is conveniently greater than central area 43. Since the lid top is more flexible than the disc, central area 43 could be greater than area 45.

If, as illustrated in FIG. 4, the force of the internal fluid pressure impinging on lid top 16 should exceed the pressure of abutment ring 32 against the lid top, the lid top is lifted away from sealing contact with abutment ring peak 34, and valve 12 is opened. A gap 46 is created between peak 34 and inner lid top surface 36, through which pressure is released from the lidded vessel, via fluid outlet port 22.

When a sufficient reduction in the force of the internal fluid pressure acting on the lid top has occurred, the resiliency of deformable, resilient top wall 16 causes disc 14 and inner lid top surface 36 to reseat in a tight sealing relationship, thereby closing the valve.

Should the force of the internal fluid pressure impinging on the lip top again exceed the pressure of the abutment ring against the lid top, valve 12 will reopen, until the fluid pressure within the lidded vessel drops sufficiently for the valve to reclose. Thus, opening and closing of the valve in response to the internal fluid pressure within the lidded vessel, recurs as required.

The internal fluid pressure required to open valve 12 is controlled by factors including the height and the diameter of abutment ring peak 34, and the flexibility of the lid top. For example, the greater the height of peak 34, the relatively greater the pressure needed; the greater the diameter of the ring peak, the relatively greater the pressure required; and the more flexible the lid top, the relatively less pressure needed. Accordingly, by selection for example of an appropriate peak height or ring peak diameter, the valve can be made to open at a predetermined internal pressure.

Attention is invited to our later description, which illustrates the relationship between diameter of the ring peak and the internal pressure needed to open valve 12. As described later, valve 12 is responsive not only to internal fluid pressure but also to temperature change.

If disc 14 were flexible, rather than semi-rigid, the disc would be seen bowed downwardly in FIG. 3 and lid top 16 would show less outward bulging. For a constant height of peak 34 and diameter of ring 32, a relatively higher internal pressure would be needed to open valve 12, if the disc were flexible, rather than semi-rigid. If, on the other hand, the disc were rigid rather than semi-rigid, internal pressure pushing against central area 43 of the lower disc surface would not strengthen the tight sealing relationship between peak 34 and inner top surface 36. When the disc is flexible, the internal pressure required for valve opening is less predictable than when the disc is rigid or semi-rigid.

When used with a lidded vessel, valve 12 is operable regardless whether a small volume of liquid is used, or the lidded vessel is filled to capacity.

Advantageously, valve 12 can be manually opened by exerting finger pressure against an outer wall 47 of sleeve 23 in a direction generally perpendicular to the central assembly axis of the valve. This type of finger pressure will move inner lid top surface 36 out of the tight sealing relationship with the abutment ring peak. Valve 12 can be maintained open by pressure exerted through the outlet port on an upper disc surface 48.

FIGS. 3 and 4 depict lidded vessel 10 containing in phantom, solids 49 and a liquid 50, to which microwave energy is applied by means of a microwave 51, also shown in phantom. Microwave 51 could be the microwave system illustrated in FIG. 14. Solids 49 may be, for example, a sample to be digested such as a gas-generating tissue sample. In this case, liquid 50 would be a digesting agent such as an acid digesting agent. Solids 49 may also be a food product to be canned using microwave energy, in which case liquid 50 would contain water; or solids 49 may be objects to be sterilized using microwave energy, in which case liquid 50 would include water.

Figure 14:
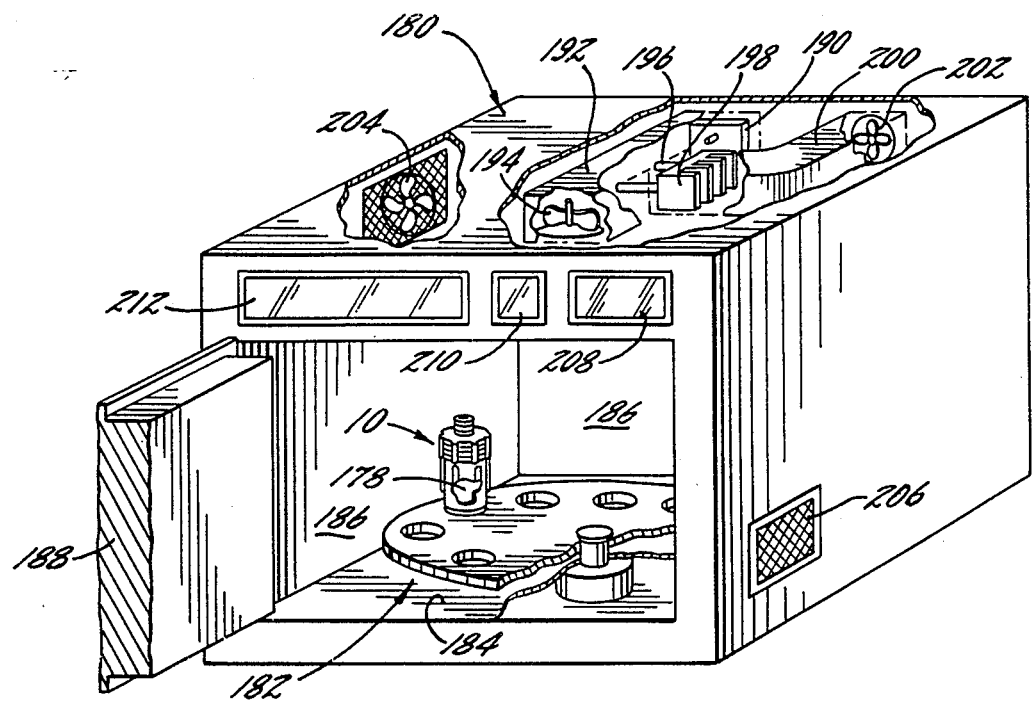
FIG. 14 is a perspective view with a partial cutaway of a microwave system containing the assembled lidded vessel and member 14 of FIG. 1, with a cutaway of a vertical wall of the lidded vessel container to show a fluid within the container.

To take advantage of the manual release feature of valve 12, lidded vessel 10 could contain a fluid as shown in FIG. 14, to which microwave energy is applied to heat the fluid and build up internal pressure for manual release of the warm or hot fluid. Exemplary fluids include, but are not limited to, a gas, a foam, a semi-fluid mixture such as a slurry, or a liquid such as a semi-solid or an emulsion. Illustrative semi-solids include gels and pastes.

For example, container 20 could be filled with a suitable shaving cream composition, and the lidded vessel assembled with disc-shaped member 14 in place. The contents of the assembled vessel could then be heated by microwave radiation for a desired period of time. The lidded vessel could then be inverted, and the valve 12 manually opened to release a warm or hot shaving cream composition. It will be appreciated that the lidded vessel is refillable, as the lid could be removed and additional material could be added to the container for dispensing or discharge.

Figure 5:
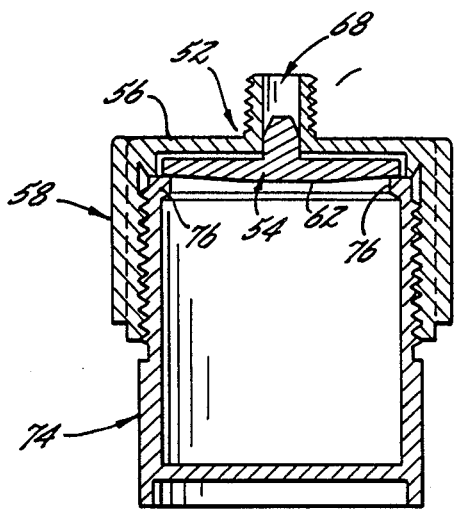
FIG. 5 is a sectional view of a second preferred embodiment of a valve in accordance with the present invention taken in a plane through the central assembly axis of a lidded vessel utilizing the valve, showing the valve in closed position.
Figure 6:
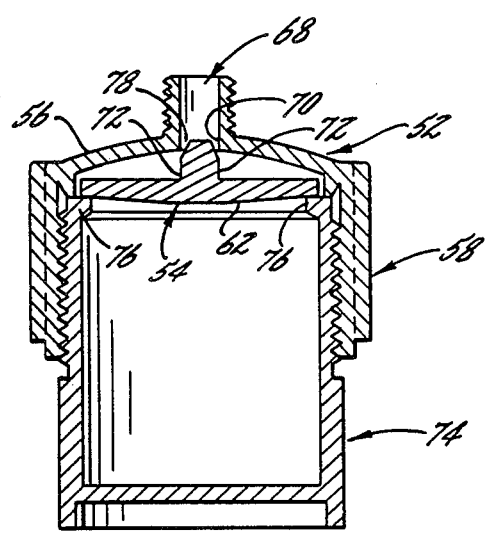
FIG. 6 is a sectional view identical to that of FIG. 5, except that the valve is shown in open position.
Figure 7:
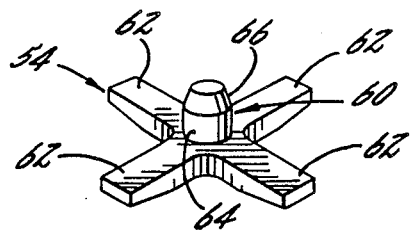
FIG. 7 is a perspective view of an element 54, shown in cross-section in FIGS. 5 and 6.

FIGS. 5-7 show a second preferred embodiment of a valve in accordance with the present invention. Valve 52 is formed by a spider member 54, and a deformable, resilient top wall 56 of a lid 58. Preferably, spider member 54 and the entirety of lid 58 are formed of a deformable, resilient, thermopolastic material, that is very preferably the same for member 54 and lid 58. Even more preferably, this material is the fluorocarbon copolymer described earlier.

Spider member 54, which is preferably semi-rigid, includes a pin part 60 and preferably leg parts 62. Pin part 60 has a stem portion 64 that preferably terminates in an inwardly tapered tip portion 66. Suitably, approximately the last 1/10th of an inch of the stem portion is tapered.

A fluid outlet port 68 is conveniently centrally located in lid 58. An inner surface 70 of the outlet port conforms to a peripheral wall surface 72 of stem portion 64. Preferably, the stem portion is cylindrically shaped. Peripheral wall surface 72 of the stem portion fits snugly against the inner surface of the outlet port to provide a tight sealing relationship.

Preferably, the tip portion of the pin part has an inward taper of about 2°-3°. This angle of taper provides for slow, controlled pressure release through the valve, and furthermore assists reseating of the pin part in the outlet port, during valve closing.

When valve 52 is used with, for example, a receptacle 74, the receptacle is advantageously provided with an inner lip 76 that preferably is continuous. The inner lip provides support to the spider member that is particularly beneficial when the valve is open, as shown in FIG. 6. When the valve is open, inner lip 76 allows the free floating spider member to be self-centering, as the stem portion is able to seek a tight sealing relationship with the inner surface of the outlet port.

So long as the force of the internal fluid pressure acting on lid top 56 is insufficient to overcome the tight sealing relationship provided by the friction fit between the stem portion and the outlet port, valve 52 remains closed, as illustrated in FIG. 5. If, as shown in FIG. 6, the force of the internal pressure impinging on the lid top should be sufficient to overcome the tight sealing relationship, the valve is opened. Fluid pressure is released through a gap 78 and then from the lidded vessel via the outlet port. Leg parts 62 of the spider member prevent expulsion of pin part 60 through the outlet port.

The release of fluid pressure through port 68 reduces the pressure within the lidded vessel. After sufficient pressure has been released, the resiliency of deformable, resilient top wall 56 of the lid assist reseating of the spider member and the outlet port in a tight sealing relationship, thereby closing the valve. The valve will reopen and reclose as necessary in response to internal fluid pressure within the lidded vessel.

The internal pressure required to open valve 52 may be controlled by the height of stem portion 64. More specifically, the greater the height of the stem portion, the relatively greater the internal pressure needed, whereas a shorter stem portion requires relatively less internal pressure. Accordingly, the valve can be made to open at a predetermined internal pressure by selecting an appropriate height for the stem portion.

Figure 8:
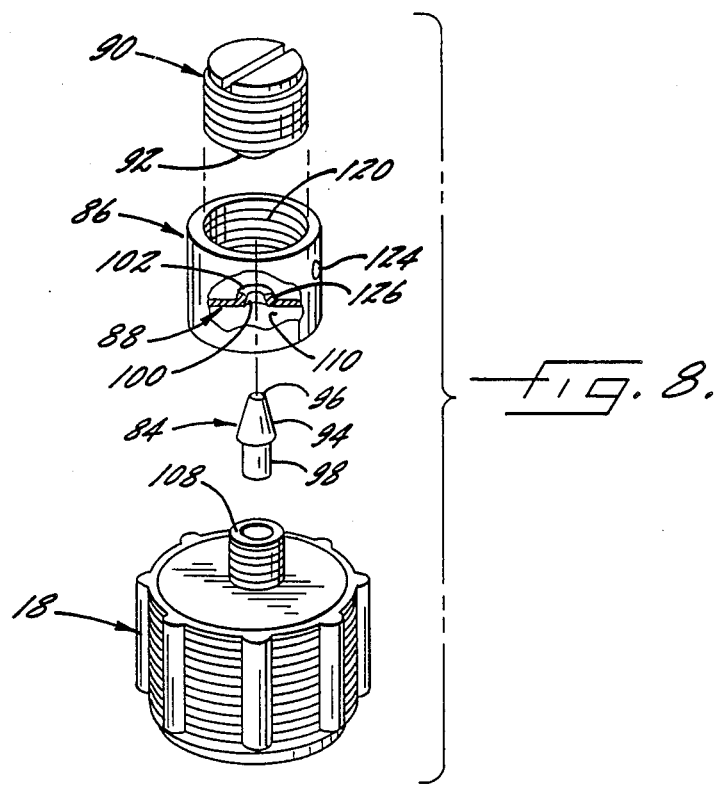
FIG. 8 is an isometric view of the components of a third preferred embodiment of a valve in accordance with the present invention, including the lid of FIG. 1.
Figure 9:
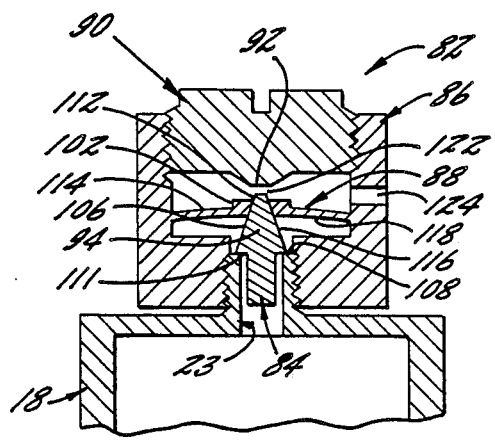
FIG. 9 is a sectional view of the assembled valve of FIG. 8 taken in a plane through the central assembly axis, showing the valve in closed position.
Figure 10:
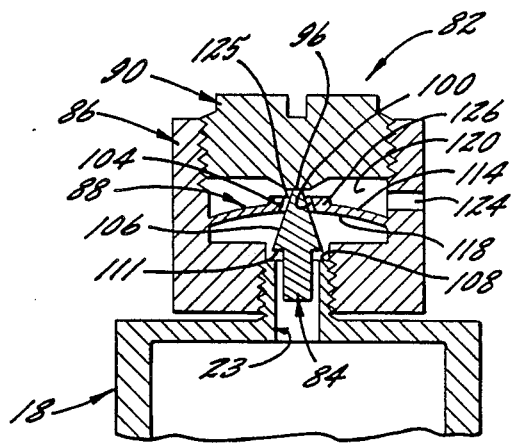
FIG. 10 is a sectional view identical to that of FIG. 9, except that the valve is shown in open position.

FIGS. 8-10 depict a third preferred embodiment of a valve in accordance with the present invention. Valve 82 is formed by an obstructing member 84, an internally threaded, hollow closure member 86 including a deformable, resilient diaphragm 88, and a screw plug 90 having an obstructing member-contacting surface 92. Member 84 could be ball- or ovoid-shaped. Preferably, valve 82 is formed of a deformable, resilient, thermoplastic material, that is very preferably the same for each of the valve components. Even more preferably, this material is the fluorocarbon copolymer described earlier.

Pin member 84 includes a preferably semi-rigid, pin head 94 that advantageously terminates in a flat tip 96, and advantageously includes a tail part 98 that extends rearwardly from the pin head. The tail part may be flexible or semi-rigid.

An opening 100 (shown in cross-section in a cutaway through the wall of closure member 86 in FIG. 8) is conveniently centrally located in diaphragm 88. Advantageously, the diaphragm includes a rigid collar 102 around opening 100. An inner surface 104 of the opening conforms to a peripheral wall surface 106 of the pin head, and is thereby able to function as the valve seat. Advantageously, the pin head is frustroconically shaped, and opening 100 is inwardly tapered, when viewed from below.

With particular reference to FIG. 9, which shows the assembled valve in closed position, pin head 94 is held in a seating relationship with valve seat, inner surface 104 of the diaphragm opening, by a rim 108 of exteriorly threaded, sleeve 23 described earlier, which is threaded into a lower chamber 110 of the preferably semirigid, hollow closure member. The pressure provided by rim 108 against a bottom surface 111 of the pin head, forces the semi-rigid pin head against flexibly deformable diaphragm 88 causing the diaphragm to bulge outwardly, thereby providing a tight sealing relationship between pin member 84 and the diaphragm opening. The diaphragm flexes exterior to rigid collar 102. A tip portion 112 of the pin head conveniently extends a preset distance above an upper surface 114 of the diaphragm. Preferably, a hind portion 116 of the pin head extends below a lower surface 118 of the diaphragm. Screw plug 90, which is preferably semi-rigid, is threaded into an upper chamber 120 of the hollow closure member to provide an adjustable gap 122 between pin membercontacting surface 92 and flat tip 96 of the pin head. Located in a side wall of the hollow closure member and above the diaphragm is a vent aperture 124.

The force of internal fluid pressure initially causes pin member 84 and diaphragm 88 to move upwardly together toward pin-member contacting surface 92; and valve 82 remains closed. Internal fluid pressure pushing the pin member upwardly, strengthens the tight sealing relationship between the pin member and the diaphragm. In this situation with bottom surface 111 of the pin head located above and out of contact with rim 108, valve 82 could be manually opened by tightening the screw plug until surface 92 thereof contacts flat tip 96 of the pin head with sufficient force to drive the pin member downwards, to thereby create an opening between peripheral wall surface 106 of the pin head and inner surface 104 of the diaphragm.

If, as shown in FIG. 10, the force of the internal fluid pressure is sufficient to drive flat tip 96 of the pin member against surface 92 of the screw plug, upward movement of the pin member is stopped, but the diaphragm continues to move upwardly. As a result, valve 82 is opened. A temporary gap 125 is created between peripheral wall surface 106 of the pin member and valve seat, inner surface 104 of the diaphragm, through which fluid pressure is released via vent aperture 124.

Donut-shaped area 126, which consists of the area of upper surface 114 of the diaphragm outside opening 100 is conveniently greater than the area of opening 100 measured with respect to upper surface 114. The greater that area 126 is relative to the opening area, the relatively more rigid the diaphragm should be, to prevent premature opening of gap 125.

After sufficient internal fluid pressure has been released, the resiliency of the diaphragm causes the pin member and diaphragm to reseat in a tight sealing relationship, thereby closing valve 82. The valve will reopen and reclose as necessary, in response to the internal fluid pressure.

The internal pressure required to open valve 82 may be controlled by the size of adjustable gap 122, with a relatively larger gap requiring a relatively greater pressure. Screw plug 90 provides for precise, manual adjustment of gap 122. Accordingly, the valve can be made to open at a predetermined internal pressure by selection of an appropriate height for gap 122. Attention is invited to our later description, which illustrates the relationship between the height of adjustable gap 122 and the internal pressure needed to open the valve.

Similar to valve 12, valves 52 and 82 are operable in conjunction with a lidded vessel, regardless whether a small volume of liquid is used or the lidded vessel is filled to capacity. Advantageously, valve 82 may be used with a lidded vessel that does not have a pressuredeformable, resilient wall. Additionally, it will be appreciated that hollow closure member 86 and lid top 16 could be molded as one piece with pin member 84 in place.

It will be noted that the fluid pressure opening valves 12 and 82 is in the same upward direction as the mechanical pressure being exerted on deformable lid top 16 or membrane 88.

Figure 11:
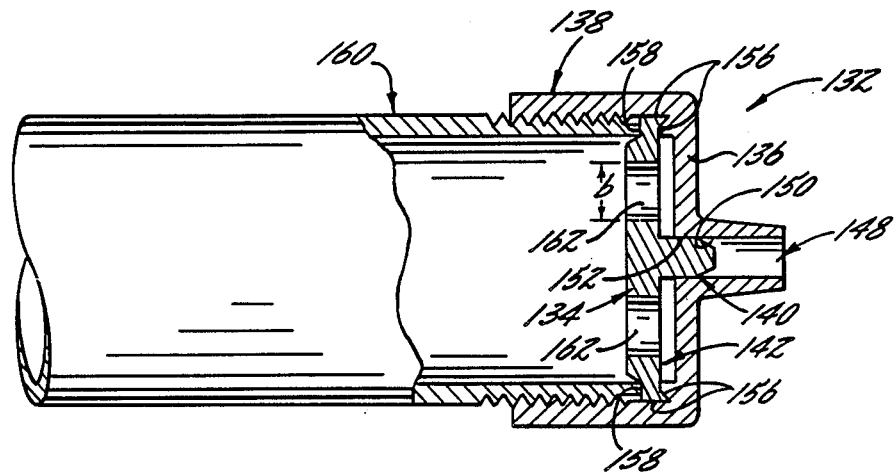
FIG. 11 is a sectional view of a fourth preferred embodiment of a valve in accordance with the present invention taken in a plane through the central assembly axis, showing the valve in closed position and disposed at an open end of a conduit.
Figure 12:
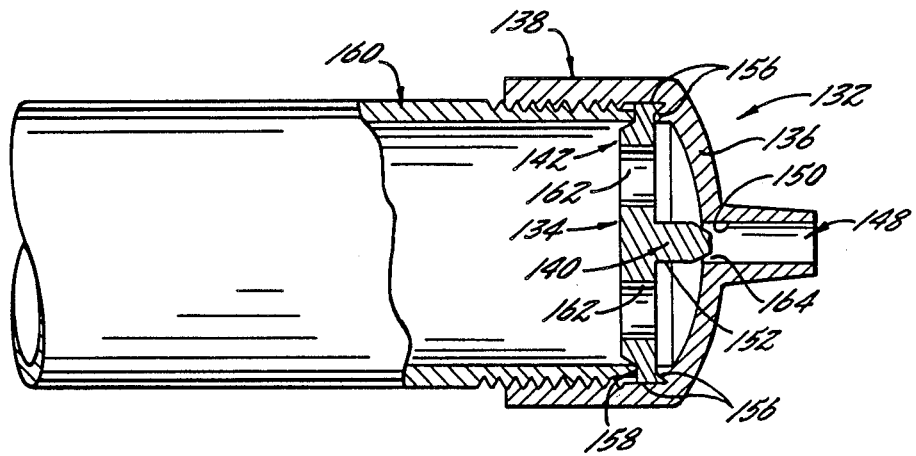
FIG. 12 is a sectional view identical to that of FIG. 11, except that the valve is shown in open position.
Figure 13:
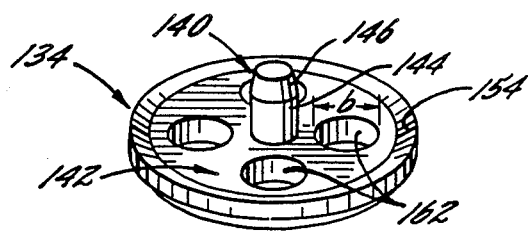
FIG. 13 is a perspective view of an element 134 of the valve of FIGS. 11 and 12.

FIGS. 11-13 show a fourth embodiment of a valve in accordance with the present invention. Valve 132 is formed by a disc-with-integral-pin-member 134, and a deformable, resilient wall 136 of a cap 138. Preferably, member 134 and the entirety of cap 138 are formed of a deformable, resilient, thermoplastic material, that is very preferably the same for member 134 and cap 138. Even more preferably, this material is the fluorocarbon copolymer described earlier.

Member 134, which is preferably semi-rigid, includes a pin part 140 and preferably a disc part 142. The pin part has a stem portion 144 that preferably terminates in an inwardly tapered tip portion 146. Suitably, the last approximately 1/10th of an inch is tapered. Preferably, the angle of inward taper is about 2°-3°. This angle of taper provides for slow, controlled pressure release through the valve.

A fluid outlet port 148 is conveniently centrally located in cap 138. An inner surface 150 of the outlet port conforms to a peripheral wall surface '52 of the stem portion of the pin part. Preferably, stem portion 144 is cylindrically shaped. The peripheral wall surface of the stem portion fits snugly against the inner surface of the outlet port to provide a tight sealing relationship.

Disc part 142 preferably has a peripheral wall surface 154 that conforms to an upper inside wall surface 156 of the cap, and thereby enables the disc part to be retained between the cap and a rim 158 of a hose or conduit 160. The conduit may be flexible, semi-rigid or rigid.

As shown in FIG. 13, located between pin part 140 and the disc peripheral wall surface are apertures 162, each having a flow area "B", defined by a diameter "b". The four apertures enable the internal fluid pressure to be exerted against pressure-deformable wall 136 of the cap. The number of apertures to achieve this end is not critical; rather, the sum of areas "B" of the apertures should not restrict flow to the cap.

So long as the force of internal fluid pressure acting on cap wall 136 is insufficient to overcome the tight sealing relationship provided by the friction fit between the pin part and the outlet port, valve 132 remains closed, as illustrated in FIG. 11. If, as shown in FIG. 12, the force of the internal fluid pressure on cap wall 136 should be sufficient to overcome the tight sealing relationship, the valve is opened. A gap 164 is created through which pressure is released via the outlet port.

Pressure release continues as long as the internal fluid pressure being exerted against cap wall 136 is sufficient to keep the valve open. However, once fluid pressure decreases sufficiently, the resiliency of deformable, resilient wall 136 of the cap effects reseating of pin part 140 and the outlet port in the tight sealing relationship, thereby closing valve 1332. The valve reopens and recloses in response to the internal fluid pressure acting on cap wall 136.

The internal pressure required to open valve 132 may be controlled by the height of stem portion 144. More specifically, the greater the height of the stem portion, the relatively greater the internal pressure needed, whereas a shorter stem portion requires relatively less internal pressure. Accordingly, the valve can be made to open at a predetermined internal pressure by selecting an appropriate height for the stem portion.

In the embodiment just described, use of a valve in accordance with the present invention other than in a lidded vessel, has been illustrated. In this embodiment, a fluid may be passed through the conduit from a remote or relatively close storage source, and discharged, ejected, or dispensed through the valve as needed or desired. It will be appreciated that member 134 of valve 132 could be interchanged with disc member 14 of valve 12, and that therefore either of these valves could be used with a lidded vessel or a conduit.

Preferably, the same material is used to form all components of our improved valve. As a result, one valve component will not become hotter than another valve component. The containers of the lidded vessels of FIGS. 1 and 3-6 are preferably formed of the same material as the pressure-deformable wall member, which results in a vesselprotecting effect. However, in some applications, a valve in accordance with the present invention is used with a container formed of a different material. For example, the valve could be formed of thermoplastic components, but the container could be formed of glass.

For use in a microwave system, the improved valve of the present invention should be microwave radiation transparent. This characteristic is achieved if the valve is made of a microwave transparent, thermoplastic material. Preferably, the same material is used to form all valve components. Exemplary microwave transparent, thermoplastic materials include, but are not limited to, polypropylene, polyethylene, polypropylene/polyethylene copolymers, and the fluorocarbon copolymer described earlier. The fluorocarbon copolymer advantageously provides a high temperature, corrosion resistant valve.

As later described in more detail, a valve in accordance with the present invention is temperature sensitive when the pressure-deformable wall member thereof is made of a thermoplastic material. Illustrative thermopolastic materials for providing a temperature sensitive valve include those just described. Advantageously, a useful thermopolastic material is moldable and precision machinable.

An eminently useful microwave system for digestion procedures is characterized by a corrosion resistant interior chamber, a corrosion resistant exhaust system capable of providing high volume air flow through the chamber, means for absorbing excess reflected radiation, and a computer-controlled variable power source. A microwave system of this type is commercially available under the trademark MDS-81 from CEM Corporation, Matthews, North Carolina. The MDS-81 microwave system is later described in more detail.

Further details of the present invention are now provided based on trials carried out in an MDS-81 microwave system, using a valve in accordance with the present invention as a relief valve for a lidded digestion vessel obtained from Savillex Corporation. Water is added to the vessel, the lid of which is provided with a vent port, and the lidded vessel is assembled with semi-rigid, disc-shaped member 14 in place, to form valve 12. Member 14, which is made of the thermopolastic fluorocarbon copolymer described earlier, has an abutment ring peak that is 0.062 inch high, and four apertures equally spaced around the abutment ring each with a diameter of ⅛ inch. The lower disc surface has a diameter of 1.53 inches. When the diameter of the abutment ring peak is ½ inch, this valve opens at about 60 psi internal pressure. In comparison, if the diameter across the ring peak is ⅝ inch, the valve opens at approximately 80 psi internal pressure, and if the ring peak diameter is ¾ inch, the valve opens at about 95 psi internal pressure.

A valve in accordance with the present invention in which the pressure-deformable, resilient wall member is made of a thermoplastic material, is not only pressure sensitive but also temperature sensitive: as the temperature of the pressure-deformable wall member increases, elasticity of the material thereof increases, and the valve opens at a relatively lower pressure. For example, as just described, when the disc of valve 12 has a ring peak diameter of ½ inch, the valve opens at about 60 psi for water. In this instance, vapors within the lidded vessel, result in top wall 16 of the lid being at a temperature of approximately 150° C. In contrast, if a liquid were used having a boiling point appropriate for producing a lid top temperature of about 60° C., the valve would open at approximately 110 psi internal pressure.

When using valve 12 for closed vessel digestions, the manual opening feature of the valve makes it possible to check for high pressure within the closed vessel, prior to opening the closed vessel to remove a digested sample.

In carrying out a closed vessel digestion, it will generally be undesirable for the relief valve to open, as digesting agent fumes may escape. However, when the digestion generates a gas, opening and reclosing of the valve will be beneficial.

A trial of valve 52 as a relief valve for the Savillex lidded digestion vessel, is now described. Water is added to the vessel, and the lidded vessel is assembled with semi-rigid, spider member 54, made of the thermopolastic, fluorocarbon copolymer described earlier, in place. The stem portion of the integral pin part of member 54, has a height of ¼ inch, and the tip portion of the pin part tapers inwardly at an angle of 2° and is 0.12 inches high. The lidded vessel is placed within an MDS-81 microwave system, and application of microwave energy is begun. When top wall 56 of the lid is at a temperature of approximately 150° C., the valve opens at about 80 psi internal pressure.

Trials using valve 82 as a relief valve for the Savillex lidded vessel are now described. Water is added to the vessel, and the lidded vessel is assembled with valve 82, made of the thermopolastic fluorocarbon copolymer described earlier, in place. The thickness of membrane 88 is 1/16th inch. Pin member-contacting surface 92 of the screw plug is adjusted to provide an adjustable gap 122 with a height of about 1/10th inch. The valve opens at about 60 psi internal pressure. In comparison, if gap 122 were about 0.15 inch, the valve would open at about 80 psi internal pressure.

As can be seen, a valve in accordance with the present invention, is capable of containing a high pressure, that is, a pressure of more than about 50 psi. Accordingly, the improved valve makes possible a closed vessel digestion at high pressure, with the strength of the lidded vessel walls being an important limitation on the internal pressure. For example, we experienced a blowout of a bottom wall of a Savillex lidded digestion vessel at about 150 psi. In contrast, the prior art, closed vessel digestion procedures described earlier, experienced leakage at considerably lower pressures. High pressure digestions should further reduce digestion time.

A thermoplastic lidded vessel such as vessel 10 may be heat treated to reduce deformability of the walls thereof. Heat treating or annealing is carried out at an appropriate temperature for a suitable period of time to obtain walls having the desired reduced deformability. For example, lidded vessel 10 could be heated at about 200° C. for about 72 hours.

FIG. 14 illustrates an MDS-81 microwave system in detail, and shows the use of this microwave system with lidded vessel 10, which contains a fluid 178 for manual dispensing. Microwave system 180 includes an internal chamber 182 formed by a floor 184, sidewalls 186, a ceiling (not shown), and a door 188. The inner surface of each of these internal chamber-forming components is corrosion resistant, for example, coated with a fluorocarbon resin such as Teflon ®.

A conventional magnetron 190 is conveniently located outside of the internal chamber, and a wave guide 192 is employed to direct the microwave radiation into the internal chamber. THe magnetron is controllable within the limits of 0 to 100 percent power input, suitably in one percentage point increments. A radiation mixer 194 for mixing and dispersing the radiation, is advantageously positioned between the magnetron and the internal chamber, to reduce the production of hot spots, which could decompose or destroy part of a sample in the internal chamber.

Between the magnetron and the internal chamber, a radiation isolator 196 is advantageously located in the wave guide, for absorbing excess reflected radiation to prevent damaging reflection back to the magnetron. Isoaltor 196 includes magnetic shapes coupled with heat sinks. The isolator permits originating microwaves emitted from the magnetron to pass through unaffected, but absorbs reflected waves. In fact, the isolator has a propensity for attracting reflected radiation and thus will tend to draw reflected radiation out of the internal chamber.

The isoaltor converts the reflected radiation to heat, which is dissipated through an isolator heat exchanger 198. A heat exchanger duct 200 communicates with the heat exchanger and a fan 202, which draws off the produced heat. Fan 202 and the isoaltor are able to absorb the full capacity of reflected energy for a zero load, i.e., an empty internal chamber, for prolonged, indefinite operation. Zero load operation enables microwave energy to be rapidly and effectively concentrated on any given sample size, even a sample having a small mass of polar material present. Total drying can be effected without damage to the magnetron and without a competing radiation absorber being present in the internal chamber.

As an alternative to isoaltor 196, a competing radiation absorbing material such as water, could be circulated through the internal chamber in radiation transparent tubing. For example, a loop of radiation transparent tubing could be conveyed through the internal chamber flooring or sidewalls from a reservoir. The temperature rise created by the absorption of radiation would effect circulation of the water through the tubing from the reservoir. A drawback of this approach is that a radiation absorber competes for radiation energy in the chamber, which can defeat heating of a small sample to near total dryness due to preferential absorption of the radiation by the larger mass of the radiation absorber.

A corrosion resistant, exhaust fan 204 is provided for removal of vapors from the internal chamber. An air intake panel 206 provides for flow of air into the chamber. As the volume of air flow through the internal chamber is important in certain applications of microwave system 180, the exhaust fan is advantageously a variable speed fan. The fan is capable of providing high volume air flow through the chamber. By "high volume air flow" is meant on the order of 100 scfm or higher.

The magnetron power input, duration of power input, and exhaust fan are advantageously computer-controlled, as selectively programmed prior to operation. For this purpose, microwave system 180 has a control panel 208, a numerical input panel 210 and a digital readout panel 212.

Additional details concerning the MDS-81 microwave system are set forth in an MDS-18 user's manual, revised March 1985, available from CEM Corporation. The description of the MDS-81 contained in this user's manual including the relevant drawings therein, are hereby incorporated by reference into this description.

As described earlier with reference to FIGS. 3 and 4, the self-regulating valve of the present invention can be used with a microwave system, not only for digesting a sample but also for home canning and sterilizing an object.

A preferred method of use of an improved valve in accordance with the present invention, for closed vessel digestion is now described with reference to FIGS. 3 and 4. Lidded vessel 10 is used with, for example, disc-shaped member 14. Lid 16 is advantageously formed of a thermoplastic material, as a result of which valve 12 is responsive to pressure and temperature. The diameter of the abutment ring peak of member 14 is of appropriate size to cause the valve to open as a pressure relief valve, at a predetermined internal pressure and temperature suitable for the particular closed vessel digestion to be carried out.

A tissue sample 49 such as oyster tissue, and a suitable amount of a liquid digesting agent 50 such as a 50:1 mixture of concentrated nitric acid and hydrofluoric acid, are introduced into container 20. Member 14 is positioned on the mouth of the container, and the container is tightly closed using lid 16. The amount of the liquid digesting agent depends on the sample size.

The tightly closed jar is placed into internal chamber 182 of the MDS-81 microwave system, and microwave energy is applied thereto. Digestion of the tissue sample generates gas. At the predetermined internal pressure and temperature, valve 12 opens to release the gas generated, acid fumes and vapors. After sufficient internal pressure has been relieved, the valve closes. The valve then reopens and recloses as necessary, in response to the internal pressure and temperature. When the digestion is complete, microwave energy is no longer applied, and the digested sample-containing lidded vessel is removed from the internal chamber.

A preferred method of use of an improved valve in accordance with the present invention, in home canning is now described. In this method, a conventional glass canning jar could be utilized with lid 16 and, for example, discshaped member 14, which are appropriately dimensioned for use with the glass jar. The lid is advantageously formed of a thermoplastic material, as a result of which valve 12 is responsive to pressure and temperature. The diameter of the abutment ring peak of member 14 is of appropriate size to cause valve 12 to open at a predetermined pressure and temperature suitable for home canning.

A food product to be canned and a small amount of a liquid such as water, are introduced into the glass jar, member 14 is positioned on the mouth of the jar, and the jar is tightly closed using lid 16. The liquid could be an aqueous solution or juices from the product.

The tightly closed jar is placed into an internal chamber of a conventional microwave appliance or of the MDS-81 microwave system, and microwave energy is applied thereto. A portion of the water is vaporized into steam, which passes up through the food product to assist in sterilization of the food product, and builds up pressure within the closed jar. At the predetermined pressure and temperature, valve 12 opens and the steam escapes through the valve, expelling air from within the closed jar. The liquid contains sufficient water, upon being converted to steam, to assist in the sterilization and to expel the air.

After steam has escaped through the valve for a suitable period of time, microwave energy is no longer applied, and the jar is removed from the internal chamber for cooling. At an appropriate internal pressure and temperature, valve 12 closes, without inflow of air into the jar. Further cooling occurs to form a vacuum within the lidded jar.

When it is desired to eat the canned food product, valve 12 is manually opened to break the vacuum, the lid is unscrewed and removed, and member 14 is removed. The lid, member 14, and the glass jar may then be reused.

An improved valve in accordance with the present invention, is similarly used for sterilizing an object. Following the procedure just described for home canning, tweezers to be sterilized are put into the glass canning jar, with a small quantity of a water-containing liquid. The diameter of the abutment ring peak of member 14 is of appropriate size to cause valve 12 to open at a predetermined internal pressure and temperature suitable for sterilization.

The tightly closed jar is placed into internal chamber 182 of the MDS-81 microwave system, which is unaffected by the introduction of a metal object into the internal chamber thereof. The liquid contains sufficient water, upon being converted to steam, to assist in the sterilization and to expel the air. After sterilization is completed, sterile air may be drawn into the jar through manually operated valve 12 if it is desired to break the vacuum prior to use of the tweezers.

The self-regulating valve of the present invention can be also used with a microwave system for enabling chemical starting materials to be reacted at a desired pressure and temperature, and dispensing or discharging the reaction product at a desired temperature; or for simply dispensing or discharging a fluid at a desired temperature. Exemplary fluids include, but are not limited to, a gas, a foam, a semi-fluid mixture such as a slurry, or a liquid such as a semi-solid or an emulsion. Illustrative semisolids include gels and pastes. Use of the valve for dispensing or discharging a fluid at a desired temperature avoids the need for temperature-sensing devices and related temperature-actuated devices.

Figure 15:
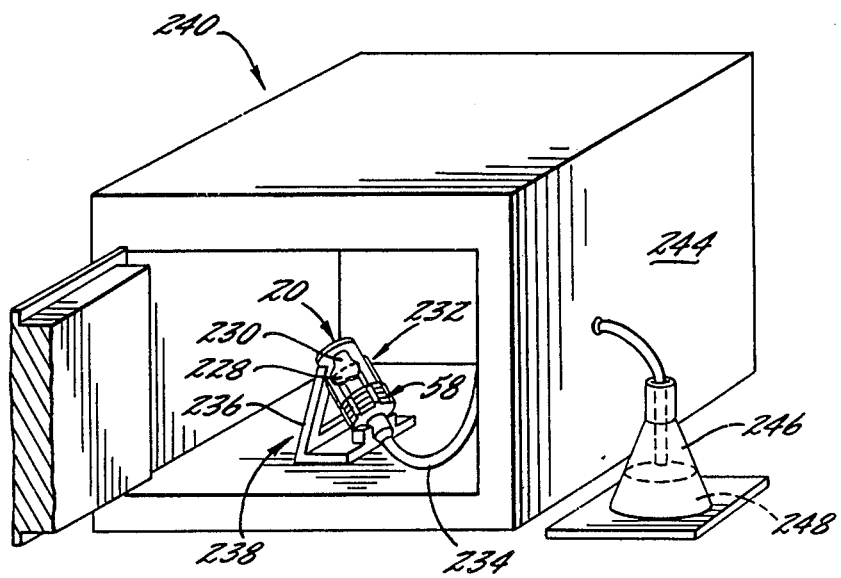
FIG. 15 is a schematic showing use of the lidded vessel and member 54 of FIGS. 5 and 6, for discharging a fluid at a predetermined temperature, with a cutaway of a vertical wall of the vessel to show fluids within the vessel.

FIG. 15 schematically illustrates the use of a valve in accordance with the present invention, for enabling fluids 228 and 230 to be reacted or combined at a desired pressure and temperature, and discharging the resulting product at a desired temperature. The fluids are depicted in the Figure with a dotted line representing the interface of the two fluids. Fluids 228 and 230 could be, for example, two liquid chemical starting materials or two immiscible liquids.

In FIG. 15, receptacle 20 and lid 58 are employed with, for example, spider member 54 (not shown). The lid is formed of a thermoplastic material, as a result of which valve 52 (not shown) is responsive to pressure and temperature. The height of stem portion 64 (not shown) is appropriate to cause the internal pressure to increase to the desired pressure for reaction or combination to occur, and to cause the valve to discharge the resulting product at the desired temperature.

For purposes of illustration, FIG. 15 is further described for two liquid chemical starting materials 228 and 230, unreactive at atmospheric pressure but reactive at a certain pressure in excess of atmospheric pressure. These liquids are added to receptacle 20, and a lidded vessel 232 is assembled with the spider member in place. A hose 234 is attached to the outlet port (not shown) of the lid, and the assembled apparatus is inverted and placed onto a holder 236 located in an internal chamber 238 of a microwave system 240. The hose is passed through an opening in an exterior wall 244 of the microwave system, and fed into a reaction flask 246 containing a liquid chemical 248 for reaction with the reaction product.

Microwave energy is applied to the starting materials, and vaporization occurs to produce a sufficient pressure for the starting materials to react. At a predetermined temperature, valve 52 opens to discharge the reaction product from the lidded vessel into the reaction flask for reaction with liquid chemical 248 at the desired temperature.

Alternatively, two immiscible liquids 228 and 230 that form an emulsion at a pressure in excess of atmospheric pressure, could be introduced into lidded vessel 232, to be discharged at a predetermined temperature as an emulsion. In this instance, the stem portion of the spider member would have an appropriate height for allowing sufficient pressure build up to effect emulsification, prior to the valve discharging the emulsion.

Also, fluids 228 and 230 could represent water and air, for providing "instant" steam. This is achieved by placing water into lidded vessel 232, and using the valve to discharge superheated water, which would convert to steam at atmospheric pressure. In this example, the stem portion would be an appropriate height for allowing sufficient pressure and temperature build up for discharge of superheated water.

If it were desired to use discharge or dispense a gas or a vapor at a desired temperature using lidded vessel 232, inversion of the lidded vessel would not be necessary.

The manual release feature of, for example, valve 12 may also be used for discharging, for purposes of illustration, a pressured fluid, such as grease, from a hose or conduit, on one end of which disc-shaped member 14 and a closure element are in place.

In the preceding description of the present invention, there are shown and essentially described only preferred embodiments of this invention, but as mentioned above, it is to be understood that the invention is capable of changes or modifications within the scope of the inventive concept expressed herein. Several changes or modifications have been briefly mentioned for purposes of illustration.

INDUSTRIAL APPLICABILITY

The improved valve of this invention is useful as a relief valve, for example, in a microwave system-based, closed vessel digestion procedure. Further uses of the valve in combination with a microwave system, include canning a food product, sterilizing an object, or dispensing a fluid such as a gas, a foam, a semi-fluid mixture such as a slurry, or a liquid such as a semi-solid or an emulsion.

We claim:

1. Digestion or sterilization apparatus which comprises a microwave system comprising a microwave heating means, and a lidded vessel comprising a container and a self-opening and self-closing temperaturesensitive valve assembly, said valve assembly being made entirely of microwave radiation transparent, thermoplastic material, and said valve assembly comprising a temperaturesensitive, pressure-deformable, resilient wall member located for direct contact with a hot gas when said lidded vessel is closed, said wall member having an outlet port, and obstructing means normally engaged to block outflow through said outlet port such that said lidded vessel is closed, said wall member being only dome-shaped or planar; wherein said valve assembly is structured so that internal fluid pressure impinging on said wall member, causes outward bulging of said wall member, the pressure-deformed wall member being domeshaped, wherein outflow through said outlet port occurs in response to a certain internal fluid pressure impinging on and deforming said wall member; and wherein said valve assembly lacks a coil spring member.

2. The apparatus of claim 1, wherein said wall member is an integral part of the vessel lid.

3. The apparatus of claim 1, wherein said container is formed of a thermoplastic material.

4. The apparatus of claim 1, wherein said microwave system comprises a corrosion resistant chamber, a corrosion resistant exhaust system capable of providing high volume air flow through the chamber, means for absorbing excess reflected radiation, and computer-controlled variable power means.

5. The apparatus of claim 1, wherein said wall member is dome-shaped when said lidded vessel is closed.

6. The apparatus of claim 1, wherein said wall member comprises means for manual relief of internal pressure.

7. A high pressure, closed vessel digestion method comprising (a) introducing sample to be digested, and an amount of a digesting agent suitable for effecting digestion into a thermoplastic container capable of withstanding high internal pressure;

(b) placing onto said container, a self-opening and self-closing temperature-sensitive valve assembly, said valve assembly being made entirely of microwave radiation transparent, thermoplastic material, and said valve assembly comprising a temperature-sensitive, pressure-deformable, resilient wall member located for direct contact with a hot gas when said lidded vessel is closed, said wall member having an outlet port, and obstructing means normally engaged to block outflow through said outlet port such that said container is closed, said wall member being only dome-shaped or planar; wherein said valve assembly is structured so that internal fluid pressure impinging on said wall member, causes outward bulging of said wall member, the pressure-deformed wall member being dome-shaped, wherein outflow through said outlet port occurs in response to a certain high internal fluid pressure impinging on and deforming said wall member; and wherein said valve assembly lacks a coil spring member;

(c) digesting said sample by applying microwave energy to the contents of the closed container, wherein a high internal fluid pressure is produced that causes outward bulging of said wall member yet said valve assembly remains closed, said high internal fluid pressure being less than said certain high internal fluid pressure; and (d) recovering the digested sample from said container.

8. A method for producing a sterile object in a sealed container, said method comprising (a) introducing an object and water into a container;

(b) placing onto said container, a self-opening and self-closing temperature-sensitive valve assembly, said valve assembly being made entirely of microwave radiation transparent, thermoplastic material, and said valve assembly comprising a temperature-sensitive, pressure-deformable, resilient wall member located for direct contact with a hot gas when said lidded vessel is closed, said wall member having an outlet port, and obstructing means normally engaged to block outflow through said outlet port such that said container is closed, said wall member being only dome-shaped or planar; wherein said valve assembly is structured so that internal fluid pressure impinging on said wall member, causes outward bulging of said wall member, the pressure-deformed wall member being dome-shaped, wherein outflow through said outlet port occurs in response to a certain internal fluid pressure impinging on and deforming said wall member; and wherein said valve assembly lacks a coil spring member;

(c) sterilizing said object by applying microwave energy to the contents of the closed container, wherein an internal pressure is produced that causes outward bulging of said wall member; and (d) cooling said container.

9. The method of claim 8, wherein said object is a foodstuff, and a canned food is produced.

* * * * *